United States Patent
Egele et al.

(10) Patent No.: US 9,435,367 B2
(45) Date of Patent: Sep. 6, 2016

(54) SCREW

(71) Applicant: Nedschroef Fraulautern GmbH, Saarlouis (DE)

(72) Inventors: Jean Joseph Egele, St. Ingbert (DE); Joerg Michael Wendels, Riegelsberg (DE)

(73) Assignee: Nedschroef Fraulautern GmbH, Saarlouis (DE)

( * ) Notice: Subject to any disclaimer, the term of this patent is extended or adjusted under 35 U.S.C. 154(b) by 208 days.

(21) Appl. No.: 14/127,229

(22) PCT Filed: Mar. 25, 2013

(86) PCT No.: PCT/EP2013/056230
§ 371 (c)(1),
(2) Date: Dec. 18, 2013

(87) PCT Pub. No.: WO2013/160043
PCT Pub. Date: Oct. 31, 2013

(65) Prior Publication Data
US 2014/0193222 A1     Jul. 10, 2014

(30) Foreign Application Priority Data

Apr. 24, 2012   (EP) .................................. 12165334

(51) Int. Cl.
F16B 35/04     (2006.01)
F16B 25/00     (2006.01)

(52) U.S. Cl.
CPC ..................... F16B 25/00 (2013.01)

(58) Field of Classification Search
CPC ...................................................... F16B 39/04
USPC ......................................... 411/411, 416, 914
See application file for complete search history.

(56) References Cited

U.S. PATENT DOCUMENTS

| | | | | |
|---|---|---|---|---|
| 3,246,556 A | * | 4/1966 | Phipard, Jr. ............ | B21H 3/027 411/416 |
| 3,434,168 A | * | 3/1969 | Bonacci .............. | F16B 25/0078 411/416 |
| 3,446,262 A | * | 5/1969 | Phipard, Jr. ......... | F16B 25/0047 411/257 |
| 3,454,070 A | * | 7/1969 | Phipard, Jr. ......... | F16B 25/0047 411/168 |
| 3,461,470 A | * | 8/1969 | Cochrum ................. | B21K 1/56 411/416 |
| 3,485,132 A | * | 12/1969 | Hanny ................ | F16B 15/0092 29/458 |
| 3,639,137 A | * | 2/1972 | Marinelli ............ | F16B 15/0092 411/548 |
| 3,681,963 A | * | 8/1972 | Muenchinger ......... | B21H 3/027 411/416 |
| 3,813,985 A | * | 6/1974 | Perkins ................... | F16B 15/00 156/332 |
| 3,831,213 A | * | 8/1974 | Bedi ....................... | B23G 9/00 411/302 |
| 3,853,606 A | * | 12/1974 | Parkinson ................ | B05D 7/16 411/903 |

(Continued)

FOREIGN PATENT DOCUMENTS

| | | |
|---|---|---|
| DE | 102 43 537 A1 | 3/2004 |
| EP | 0 987 452 B1 | 3/2000 |
| EP | 2 657 547 B1 | 4/2014 |

OTHER PUBLICATIONS

International Search Report of PCT/EP2013/056230, mailed Jul. 11, 2013.

*Primary Examiner* — Roberta Delisle
(74) *Attorney, Agent, or Firm* — Collard & Roe, P.C.

(57) ABSTRACT

The invention relates to a self-tapping screw (1) consisting of a low-strength non-ferrous material, having a screw body (3) which is provided, at least in regions, with a coating (5), wherein the coating (5) is formed from an elastomer or polymer material enriched with fillers.

6 Claims, 1 Drawing Sheet

(56) References Cited

U.S. PATENT DOCUMENTS

| | | | | |
|---|---|---|---|---|
| 3,894,570 A * | 7/1975 | Reynolds | B21H 3/027 | |
| | | | 118/621 | |
| 4,091,173 A * | 5/1978 | Hage | F16B 33/008 | |
| | | | 411/387.1 | |
| 4,315,340 A * | 2/1982 | Veldman | B21H 3/02 | |
| | | | 411/416 | |
| 4,430,036 A * | 2/1984 | Chapman | B21H 3/027 | |
| | | | 411/416 | |
| 4,486,135 A * | 12/1984 | Kazino | F16B 25/0078 | |
| | | | 411/411 | |
| 4,657,460 A * | 4/1987 | Bien | F16B 33/004 | |
| | | | 411/258 | |
| 4,802,807 A * | 2/1989 | Offenburger | C23C 14/16 | |
| | | | 411/387.1 | |
| 6,494,656 B1 * | 12/2002 | Boyer | B21H 3/027 | |
| | | | 411/399 | |
| 6,595,733 B1 * | 7/2003 | Willert | E04D 13/0725 | |
| | | | 411/311 | |
| 6,994,502 B2 * | 2/2006 | Winter | F16B 35/048 | |
| | | | 411/411 | |
| 7,179,036 B2 * | 2/2007 | Griffin | F16B 25/0021 | |
| | | | 411/301 | |
| 7,195,437 B2 * | 3/2007 | Sakamoto | F16B 33/06 | |
| | | | 411/258 | |
| 7,938,609 B2 * | 5/2011 | Mori | F16B 25/0021 | |
| | | | 411/386 | |
| 7,950,885 B2 * | 5/2011 | Rosenkranz | F16B 25/0026 | |
| | | | 411/258 | |

* cited by examiner

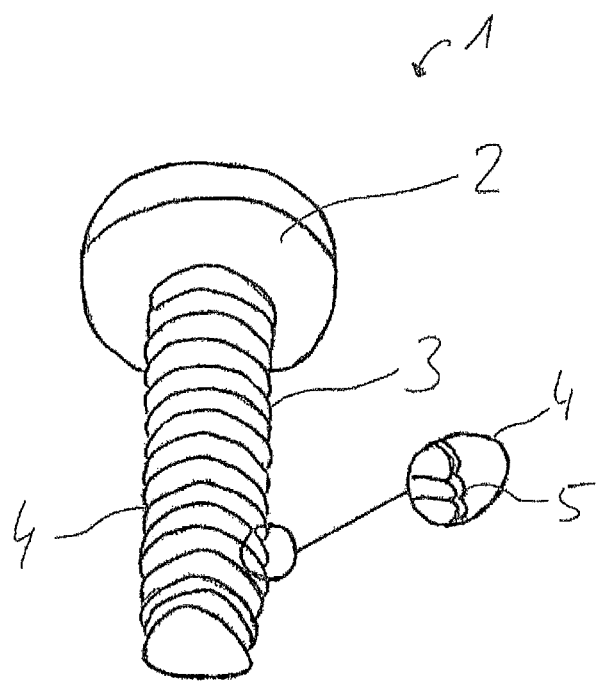

SCREW

CROSS REFERENCE TO RELATED APPLICATIONS

This application is the National Stage of PCT/EP2013/056230 filed on Mar. 25, 2013 which claims priority under 35 U.S.C. §119 of European Application No. 12165334.9 filed on Apr. 24, 2012, the disclosures of which are incorporated by reference. The international application under PCT article 21(2) was not published in English.

The invention relates to a self-tapping screw consisting of a low-strength non-ferrous material, having a screw body that is provided with a coating, at least on some regions.

Such self-tapping screws are regularly produced from a steel material. In this connection, it is known to harden the layers of the thread-carrying screw body that are close to the surface, by means of case-hardening or also by means of nitriding.

In the sector of the automotive industry, in particular, there is the requirement to reduce the weight of all components, and therefore also of screws, to a minimum. A self-tapping screw that consists of a low-strength non-ferrous material is known from EP 0 987 452 B1. The shaft region that carries the self-tapping thread is coated with a hard layer that has a greater hardness than the screw material. In this connection, a plastic screw is disclosed, which is provided with a metal layer. Furthermore, it is proposed to obtain metallic screws that consist of aluminum or magnesium by means of surface modification or also by means of application of a layer composed of a different material, for example by means of thermal spraying, PVD, or CVD. However, in coating of screws made of a non-ferrous material, particularly an aluminum material, which has a very low specific weight, the problem exists that when such a hard layer is applied, for example also in the form of a glass-ceramic layer, great hardening temperatures are required, which can have a negative influence on the structure of the screw material.

This is where the invention seeks to provide a remedy. The invention is based on the task of creating a self-tapping screw that is formed from a light, non-ferrous material, and in which the aforementioned disadvantages are avoided. According to the invention, this task is accomplished by means of a screw having the characteristics of the characterizing part of claim 1. By means of formation of the coating from an elastomer or polymer material enriched with fillers, coating at low temperatures is made possible.

In a further development of the invention, the screw body has a trilobular cross-section. Self-retention of the self-tapping screw is brought about by means of the trilobular thread.

Preferably, the screw material is aluminum or magnesium or an alloy of one of these materials. In this way, a particularly light screw is achieved. Furthermore, such materials are less corrosive, so that the problems known for steel screws are avoided. Alternatively, the screw can also be produced from copper.

In a further embodiment of the invention, the coating is formed from a nanocomposite material. These are materials having a preferably polymer-type matrix, which are provided with inorganic nanoparticles. Surprisingly, it has been shown that when using nanocomposite materials, very good screw properties can be achieved, even if the coating has a lower hardness than the screw material. By means of the addition of nanofillers or nano-additives, it is possible to simultaneously increase the impact resistance and the strength of a polymer. Aside from the possibility of thermal hardening, which can take place at temperatures on the order of 250°, lower temperatures can be used by means of the use of polymerizable inorganic groups. For example, hardening can take place photochemically. For example, hardening of the coating at room temperature is actually possible by means of the use of condensation catalysts.

Preferably, the nanocomposite material is an acrylate or silicate composite material. However, promising results were also achieved by means of the use of clay Nanomer plates. Further suitable nanofillers for adjustment of the properties of the coating are known to a person skilled in the art.

Other further developments and embodiments of the invention are indicated in the other dependent claims. An exemplary embodiment of the invention is shown in the drawing and will be described in detail in the following. The single FIG. 1 shows the schematic representation of a trilobular self-tapping screw.

The screw 1 selected as an exemplary embodiment consists of a screw head 2 as well as a screw body 3 formed onto it, which body is provided with a trilobular thread 4. The screw body 3 is provided with a coating 5 that is formed by a nanocomposite material. This nanocomposite material is produced on the basis of a polyurethane, in the present case, which is composed of two polymer components, to which clay plates in a nano size have been added. The result is a very rigid layer capable of resistance, which simultaneously demonstrates good stretchability. In the exemplary embodiment, the thickness of the layer amounts to 6 μm. In generally, layer thicknesses between 2 μm and 20 μm have proven to be advantageous. Of course, the nanoparticles can also have different shapes, such as, for example, a spherical or tubular shape.

By means of the use of other inorganic nanoparticles as the additive, as well as by means of the use of other polymer-type matrices, the property of the coating can be adjusted in accordance with the area of use of the self-tapping screw. For example, resistance to high temperatures or also to acid can be achieved in this manner.

In the exemplary embodiment, a screw of the type described above is screwed into a component made of magnesium, provided with a borehole, whereby the screw cuts its own thread. By means of the coating according to the invention, particularly using a nanocomposite material for the coating, the surface pressure that can be absorbed by the screw is clearly increased, thereby making it possible to cut a thread with the aluminum screw despite the hardness of the magnesium material. In this connection, it has been shown that the coating simultaneously has a lubricant effect, thereby facilitating the screwing-in process.

The invention claimed is:

1. Self-tapping screw consisting of a screw body that is provided with a coating, at least on some regions, wherein the screw body and the coating each consist of a low-strength non-ferrous material and wherein the coating is formed from an elastomer or polymer material enriched with fillers.

2. Screw according to claim 1, wherein the screw body has a trilobular cross-section.

3. Screw according to claim 1, wherein the screw material is aluminum or magnesium or an alloy of one of these materials.

4. Screw according to claim 1, wherein the coating has a lesser hardness than the screw material.

5. Screw according to claim 1, wherein the coating is formed from a nanocomposite material.

6. Screw according to claim 5, wherein the nanocomposite material is an acrylate or silicate composite material.

* * * * *